April 4, 1967 G. MÄRKL ETAL 3,312,791
COMMUNICATION SYSTEM-LINE SUPERVISION
AND LINE FAULT LOCATION
Filed June 25, 1963
G 1-17-62 due
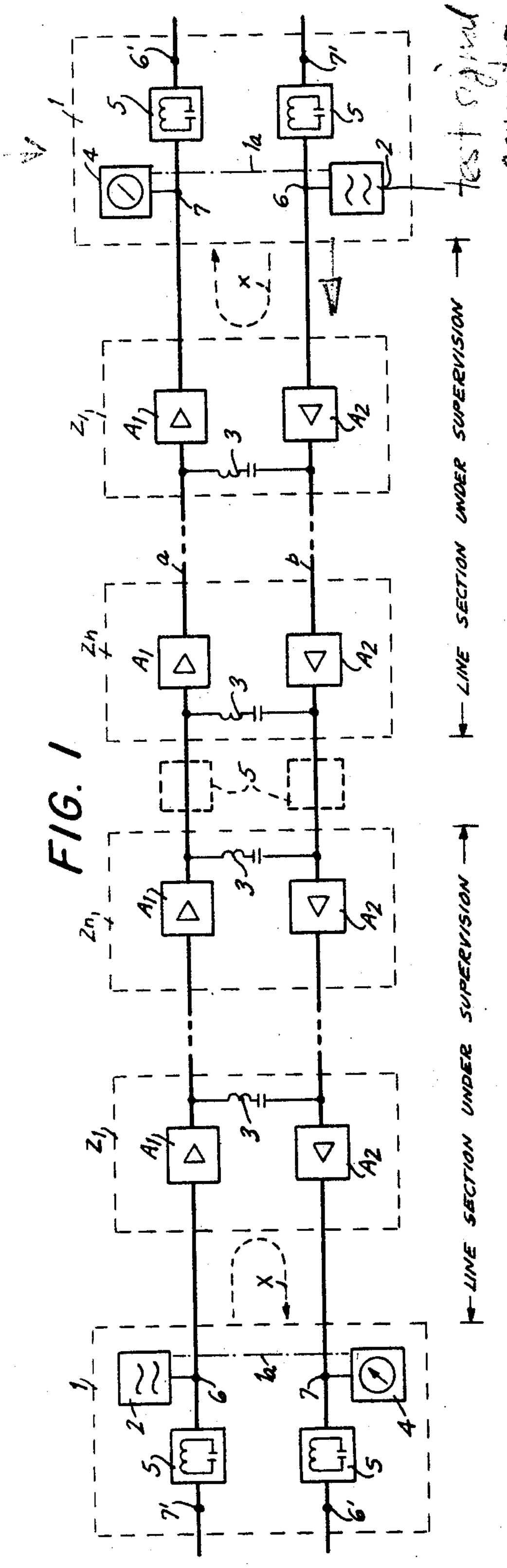
FIG. 1
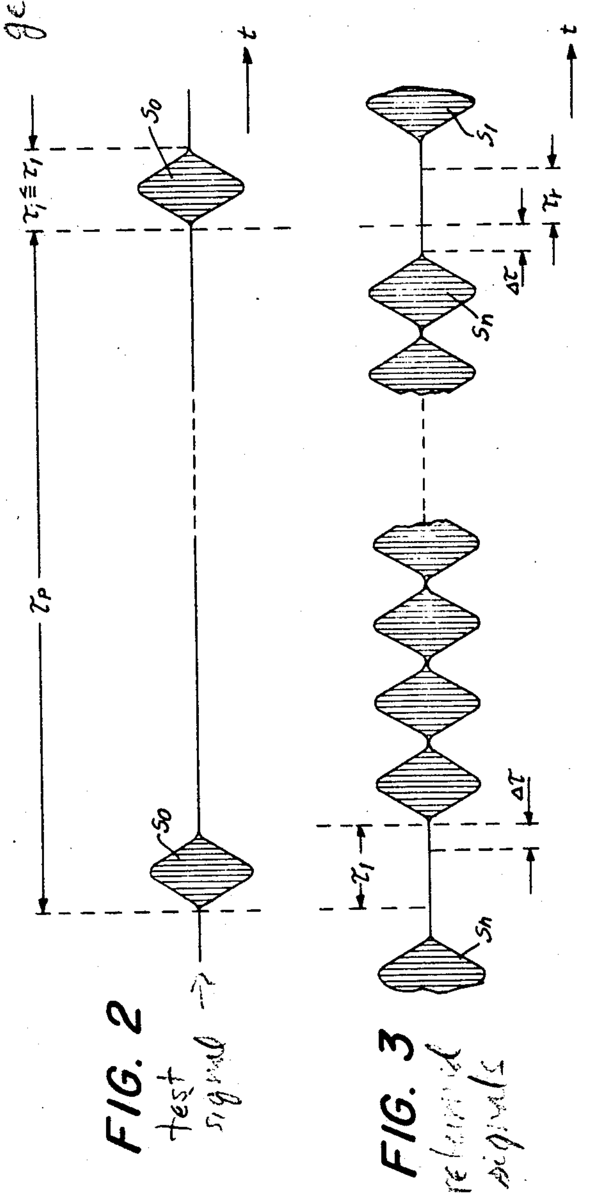
FIG. 2 test signal
FIG. 3 returned signals
INVENTORS
GEORG MÄRKL
SIEGFRIED FRIEDRICH
BY
Michael S. Striker
Atty
G 1161321

United States Patent Office 3,312,791

Patented Apr. 4, 1967

3,312,791

COMMUNICATION SYSTEM-LINE SUPERVISION AND LINE FAULT LOCATION

Georg Märkl and Siegfried Friedrich, Nurnberg, Germany, assignors to Felten & Guilleaume Fernmeldeanlagen G.m.b.H., Nurnberg, Germany Filed June 25, 1963, Ser. No. 290,449
10 Claims. (Cl. 179—175.3)

The present invention concerns a carrier-frequency communication system including a four-wire two-way transmission line adapted to carry intelligence signals in one pair of wire in one direction and in the other pair of wires in the opposite direction.

In a communication system of this type comprising usually unattended repeater stations it is customary to have a supervisory station monitor and test the line sections between the supervisory station and the repeater stations and to find out in the case of a failure in which repeater station or in which line section the fault is located. This is of particular importance if not only the cable or other wire connections but also the unattended repeater stations are underground installations. The testing and the fault location is usually carried out in a particular manner according to which the supervisory station transmits a test signal which is returned by the respective repeater stations to the supervisory station for evaluation.

Several rather involved and rather expensive methods and systems are known and have been used for this purpose. However, the known systems entail several disadvantages. For instance, in a system using different testing frequencies the individual repeater stations must be equipped with bandpass filters each passing a different frequency band so that the equipment of these individual repeater stations is not interchangeable between stations. This means that for a certain number of repeater stations an equal number of different filters must be provided. Also, the frequency range of the amplifiers in the repeater stations must be increased so as to comprise also the total range of the various adjacent testing frequencies, or a corresponding frequency gap must be cut out from the normal intelligence signals carrying frequency band. However, in order not to be forced to make the frequency band of the repeater amplifiers exceedingly large the test signal frequencies must be crowded closely together i.e. each filter must have a comparatively very narrow bandpass range which makes these filters rather expensive (in certain cases even quartz filters are necessary) and may cause these filters to be rather unstable. Moreover, in the case of test frequencies crowded closely together the frequencies at the transmitter and receiver must be adjusted very accurately in order to prevent one being inadvertently tuned to a neighboring frequency. If blocking filters are provided for preventing the test signals to reach other line sections also these blocking filters must have a comparatively broad range of frequencies to be blocked whereby also these filters are rendered rather expensive.

In a conventional pulse code system used for the above purpose some of the signals which return via circuit loops not under consideration must be suppressed and in addition a quantitative transit time measurement must be carried out with substantial accuracy. If in another known method frequency modulated signals are used then an additional circuit is required namely a remote current supply circuit. In order to make it possible to carry out this fault locating system in the case of the occurrence of a fault special steps must be taken for maintaining the current supply through the above-mentioned remote current supply circuit. Generally speaking in all known methods which are intended to permit their execution during normal operation of the transmission system, the equipments used therefore are not interchangeable, and on the other hand, if the equipments are interchangeable then tests and fault location cannot be carried out during ordinary operation of the communication system.

It is therefore an object of this invention to provide for a method and apparatus which avoids all the disadvantages of the known systems.

It is another object of this invention to provide for a method and apparatus which permits checking the operativeness of line sections and repeater stations during normal operation of the transmission line, and nevertheless permits interchanging the equipments used.

It is another object of this invention to provide for a method and equipment for the purpose set forth which is comparatively simple in structure and entirely reliable in operation.

With the above objects in view the invention includes a method of checking by means of test signals the operativeness of, and of locating existing faults in, a carrier-frequency communication system operating with at least one supervisory station and at least one repeater station along a four-wire two-way transmission line, each of said repeater stations including cross-connection means permitting only test signals but no intelligence signals to pass between the two pairs of wires of the four-wire transmission line, comprising the steps of: transmitting from a supervisory station via one of said pairs of wires a test signal consisting of a pulse-amplitude modulated frequency located outside the frequency band used in ordinary communication through said carrier-frequency communication system; causing said test signal to be returned to said supervisory station from any repeater station which is in operative condition and connected with said supervisory station by a four-wire line section in operative condition, via said cross-connection in the respective repeater station and via the other pair of wires of said four-wire transmission line; and causing said test signal to be indicated at said supervisory station if and as it is returned from said repeater station so that the indication of a returned test signal shows to what degree the repeater station from which it is returned and the four-wire transmission line section between the supervisory station and the particular repeater station are in operative condition.

In another aspect of this invention it includes an arrangement for checking the operativeness of, and for locating existing faults in, a carrier-frequency communication system including a four-wire two-way transmission line adapted to carry intelligence signals in one pair of wires in one direction and in the other pair of wires in the opposite direction, comprising, in combination, at least one supervisory station connected with said four-wire transmission line and comprising generator means for producing a periodic sequence of test signals consisting of a pulse amplitude modulated frequency located outside the frequency band used for intelligence transmission in said carrier-frequency communication system, and for applying said test signals to one pair of wires of said four-wire transmission line, and indicator means for indicating test signals returned to said supervisory station through the other pair of wires of said four-wire transmission line; and at least one repeater station arranged along said four-wire transmission line and including first amplifier means inserted in one pair of wires of said four-wire transmission line and second amplifier means inserted in the other pair of wires thereof, and filter means interchangeable against each other and transversely connected between the output of one of said amplifier means and the input of the other amplifier means and permitting passage only of said test signals from said one pair of wires to said other pair of wires, so that a test signal transmitted from said supervisory station will be returned thereto and indicated therein depending upon the operative condition of said repeater station and the transmission line section between said supervisory station and said repeater station.

It will be seen that the method and apparatus according to the invention entails among others the great advantage that the equipments of all the repeater stations in a communication system are all of uniform type and thus interchangeable against each other. Nevertheless, all of the repeater stations and line sections belonging to one area to be supervised and tested by one supervisory station may be tested simultaneously during operation of the communication system without the necessity that test signal transmitters or receivers must be tuned to a plurality of closely juxtaposed test signal frequencies. It suffices that the testing equipment of a supervisory station namely an impulse generator and a receiver are switched on whereafter, preferably by means of oscillographic evaluation of the test signals, the operative condition of all the usually unattended repeater stations and of the pertaining line sections belonging to a portion of the transmission line to be supervised are evaluated simultaneously.

Since the testing and the location of faults can be carried out during the operation of the transmission line it is even possible to recognize the start of the development of a failure and to remedy the reason thereof before a total failure occurs. This is a substantial advantage over those systems which can be applied only when the transmission line is not in operation.

It will be shown that the invention makes it also possible to provide for blocking filters which prevent the penetration of a test signal used for checking one line section from penetrating into line sections supervised by other supervisory stations so that within the entire communication system a plurality of tests for checking the operativeness of line sections and repeater stations may be carried out independently and simultaneously.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 1 is a diagrammatic illustration of a four-wire two-way transmission line for a carrier-frequency communication system comprising the characteristic features of the invention;

FIG. 2 is a diagram illustrating in reference to time the shape and spacing of pulse-like test signals according to the invention; and FIG. 3 is a similar diagram illustrating specifically test signals returned from a plurality of repeater stations and indicated at the pertaining supervisory station in the course of carrying out the method according to the invention.

FIG. 1 shows a communication system comprising a four-wire two-way transmission line with one line *a* consisting of one pair of wires for carrying signals in one direction and a second line *b* consisting of the second pair of wires for carrying messages in the opposite direction, and two supervisory stations 1 arranged across the lines *a*, *b*, and each supervising a line section in which a plurality of repeater stations $Z_1 \ldots Z_n$ are provided. For obvious reasons each repeater station is equipped with one amplifier $A_1$ inserted in the line *a* and a second amplifier $A_2$ inserted in the line *b*.

For understanding the invention it will be sufficient to discuss first only the details and operation in the right one of the two illustrated line sections. The supervisory station 1 is equipped with a test signal generator 2 connected at 6 with the line *b*, and with an indicator device e.g. an oscillograph 4 connected at 7 with the other line *a*. The signal generator 2 is of conventional design and furnishes a test signal consisting of a pulse-amplitude modulated frequency which is located outside the frequency band used for transmitting intelligence signals through the illustrated communication system. The signal generator 2 produces a periodic sequence of the above-mentioned test signals $S_0$ as illustrated by FIG. 2, and at a pulse frequency which will be discussed further below. The thus produced pulse sequences are applied to the line *b*.

As can be seen, each repeater station $Z_1 \ldots Z_n$ comprises a filter 3 of conventional type which is connected between the output of the amplifier $A_2$ and the input of the amplifier $A_1$. These filters 3 are designed and constructed to pass only the frequency of the pulse signals $S_0$ including significant harmonics produced by the pulse modulation, from line *b* to the line *a*. Consequently, if the four-wire transmission line between the supervisory station and the individual repeater stations as well as the latter are in operative condition the thus applied test signal will be returned to the supervisory station along the line *a*. The return signal is received by the indicator 4 which may be an oscillograph where the test signals can be evaluated.

Since the individual repeater stations $Z_1 \ldots Z_n$ have different distances from the supervisory station 1 each individual test signal pulse is returned repeatedly to the supervisory station 1 after respectively different transit times $\tau_1 \ldots \tau_n$ associated respectively with the individual repeater stations so that in the indicator device 4 a sequence of such returned test signals will appear, the number of which will indicate how many line sections and/or repeater stations are in operative condition. Also the amplitude of the return signal may be observed in order to draw therefrom a conclusion as to the degree of operativeness of the respective line sections and repeater stations. Of course, if the distance from the supervisory station 1 to the first repeated station $Z_1$ and the individual distances between the remaining repeater stations are equal to each other then the transit time related to the most remote repeater station $Z_n$ will amount to $n \cdot \tau_1$.

It will be understood that if *n* returned signals appear at the indicator 4 in response to an individual test signal pulse emitted by the associated signal generator 2, then the entire line section under supervision is free of disturbances and in complete operative position. However if there is a failure somewhere in a line section between a supervisory station and/or the individual repeater stations, or in any one of the repeater stations, then only as many returned signals will appear in the indicator device 4 as there are operative line sections and repeater stations between the supervisory station 1 and the location of the fault.

If the indicating device 4 in the supervisory station 1 is an oscillograph then the returned test signals would appear on the screen as illustrated by FIG. 3, namely as a sequence of pulse-like signals $S_1 \ldots S_n$ shaped similar to the originally transmitted test signals $S_0$ shown by FIG. 2. Of course, the sequence of returned signals shown in FIG. 3 applies to the case where the distances between the individual repeater stations $Z_1 \ldots Z_n$ are all equal . Evidently, the screen picture illustrated by FIG. 3 would indicate that all the line sections and all the repeater stations $Z_1 \ldots Z_n$ are in good operating condition. It can be seen readily that in this manner the system according to the invention makes it possible to test and supervise all the repeater stations and interposed line sections simultaneously at one supervisory station assigned to supervise a line portion including the repeater stations $Z_1$ to $Z_n$. In order to obtain on the screen of an oscillograph 4 a stationary picture without providing for special synchronization steps, it is advisable to use in the signal generator 2 a pulse frequency which is equal to the sweep frequency of the oscillograph and to couple the just mentioned two frequencies with each other. For instance, the sweep pulse generator of the oscillograph 4 may be coupled as indicated by the dash-dotted line 1*a* with the signal generator 2 so as to control the pulse frequency of the latter, or inversely the signal generator 2 may be coupled in the same manner with the oscillograph 4 for controlling the deflection voltage thereof. However, it is of course also possible to evaluate the returned test signals in a different manner, e.g. by means of a receiver controlling an indicating instrument or a recorder, in which case a counter may select out of the series of return signals one of them so that for a given period of time only the return of that one selected signal associated with one particular line section or repeater station is indicated. By manual or automatic control the selection of the signal to be indicated may be changed sequentially so that in this manner the return of a test signal from every one individual line section and/or repeater station is sequentially tested.

It can be seen that in the above described system the filters 3 in the individual repeater stations are all subject to the same conditions, namely they must be constructed for passing only one particular type of a test signal as illustrated by FIG. 2 while at the same time blocking passage of the frequency band used in the communication system for transmitting intelligence. Consequently, these filters 3 and as a matter of fact the entire equipment of the repeater stations are freely interchangeable with each other so that for any number of repeater stations only one type of equipment has to be kept in stock for occasional exchange as well as for installation of the new repeater stations.

Some remarks regarding the test signals are in order. In view of the necessary build-up time of the filters 3 and in order to avoid substantial impulse distortions that may be caused by the filters, the pulse of the test signals $S_0$ should have as long a duration as possible. However, for practical reasons the pulse duration $\tau_1$ must not exceed the transit time $\tau_1$ of a test signal returning via the first or nearest repeater station $Z_1$ i.e. the time required for the test signal to travel from the generator 2 to the repeater station $Z_1$ and to return from there to the indicator 4 of the same supervisory station 1. If the pulse duration were greater than the returning signals associated with more than one repeater station would overlap so that it would be difficult to evaluate them. Moreover, if the distance from the supervisory station 1 to the first repeater station $Z_1$ is equal to the distances between the individual repeater stations, and if the pulse duration is $\tau_1=\tau_1$ then a rectangular pulse shape modulating the test signal frequency would be unsuitable because the trailing flank of one signal would coincide with the leading flank of the next following returning test signal so that for instance in the case of *n* returning individual signals $S_1$ to $S_n$ each having a duration of $\tau_1$ only one signal would appear which would have the duration of $n\cdot\tau_1$ and no evaluation thereof would be possible in the manner in which a signal sequence as illustrated by FIG. 3 can be evaluated. If a rectangular pulse would be chosen for the modulation of the test signal frequency then its duration would have to be substantially shorter than the transit time $\tau_1$ but this is not advisable in view of the above-mentioned required build-up time of the filters 3 and of the possibility of impulse distortions. In any case, it is definitely preferable that at least one of the flanks of the pulse deviates distinctly from the vertical. Most desirable are pulse shapes as illustrated by FIG. 2 which have no sharp corners and have distinct sloping leading and trailing flanks.

FIGS. 2 and 3 illustrate the conditions to be met in selecting the pulse period or pulse repetition rate of the test signals. The pulse period i.e. the time interval $\tau_p$ between equivalent portions of two consecutive pulse signals $S_0$ must be so great that after transmission of a first test pulse $S_0$ the last one of the returned signals $S_n$ will not overlap the first returned signal $S_1$ caused by the transmission of the next following test pulse $S_0$. In addition, there should be taken into consideration also the retrace time $\tau_r$ of the cathode ray in the oscillograph and the time interval $\Delta\tau$ required for providing for a lateral distance between the edges of the screen and the first and last signals, respectively, as indicated in FIG. 3. Even if these small time periods $\Delta\tau$ and $\tau_r$ are disregarded, the pulse period $\tau_p$ must be at least equal to the transit time $\tau_n$ or $n\cdot\tau_1$. This means, that the repetition rate of the test signal pulses must not exceed the reciprocal of the transit time required for the test signal to travel to the most remote supervised repeater station and to return to the supervisory station from which the signal was emitted.

If the transmission line of a communication system is very long and if a plurality of supervisory stations is arranged along this transmission line then it may occur that several of these supervisory stations want to check the respectively associated line sections or to locate a fault. It will be understood that under such circumstances it is possible that the simultaneous tests made by several supervisory stations might interfere with each other. Therefore it is advisable to separate the line sections under supervision by the individual supervisory stations from each other by means of blocking filters arranged in the four-wire transmission line and constructed so that they block the test signals but permit passage of the intelligence carrying signals. As illustrated by FIG. 1 such blocking filters 5 may be installed in the supervisory stations 1 so that the test signals emitted by the generators 2 can travel only in the directions indicated by the arrows X and not in the directions opposite thereto from the respective supervisory stations 1. Of course, in this case the two line sections shown in FIG. 1 and located between the illustrated supervisory stations 1 are not separated from each other so that these two neighboring supervisory stations could not carry out a test or locate a fault simultaneously. Only supervisory stations which are not in this manner closely adjacent to each other could carry out such tests simultaneously. However, this small disadvantage can be overcome if similar blocking filters 5 were arranged between the remotest repeater stations $Z_n$ or in one of them or even in both of them, as indicated in dotted lines in FIG. 1. On the other hand, there is also the possibility of extending the line section to be supervised and checked by one supervisory station 1 as far as to the next following supervisory station 1 in which case the line portion assigned for supervision to the second mentioned supervisory station would be located on the opposite side theref. The direction in which a supervisory station will then be able to carry out the above described tests would depend only on whether the signal generator 2 and the indicator device 4 is connected within the particular supervisory station 1 with the lines *a* and *b*, respectively, at the points 6 and 7 or at the points 6' and 7' shown in FIG. 1.

It will be understood that each of the elements described above, or two or more together, may also find a useful application in other types of a method and arrangement for checking the operativeness of, and for locating existing faults in, a communication system differing from the types described above.

While the invention has been illustrated and described as embodied in a method and arrangement for checking the operativeness of, and for locating existing faults in, a carrier-frequency communication system including a four-wire two-way transmission line, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. A method of checking by means of test signals the operativeness of, and of locating existing faults in, a carrier-frequency communication system operating with at least one supervisory station and a plurality of repeater stations along a four-wire two-way transmission line, each of said repeater stations including cross-connection means interchangeable against each other and permitting only test signals but no intelligence signals to pass between the two pairs of wires of the four-wire transmission line, comprising the steps of: transmitting from a supervisory station via one of said pairs of wires a periodic sequence of test signals consisting of a pulse amplitude modulated frequency located outside the frequency band used in ordinary communication through said carrier-frequency communication system; causing said test signals to be returned to said supervisory station from any repeater station which is in operative condition and connected with said supervisory station by a four-wire line section in operative condition, via said cross-connection in the respective repeater station and via the other pair of wires of said four-wire transmission line; and causing said test signals to be indicated at said supervisory station if and as they are returned from any of said repeater stations so that the indication of a returned test signal shows to what degree the repeater station from which it is returned and the four-wire transmission line section between the supervisory station and the particular repeater station are in operative condition.

2. A method of checking by means of test signals the operativeness of, and of locating existing faults in, a carrier-frequency communication system operating with at least one supervisory station and a plurality of repeater stations along a four-wire two-way transmission line, each of said repeater stations including cross-connection means interchangeable against each other and permitting only test signals but no intelligence signals to pass between the two pairs of wires of the four-wire transmission line, comprising the steps of: transmitting from a supervisory station via one of said pairs of wires a periodic sequence test signals consisting of a pulse amplitude modulated frequency located outside the frequency band used in ordinary communication through said carrier-frequency communication system, said test signals being characterized by a pulse shape having at least one flank deviating distinctly from the vertical the repetition rate of said test signals being at most equal to the reciprocal of the transit time required for a test signal to travel from said supervisory station to the remotest one of said repeater stations to be checked by said supervisory station and to return from there to said supervisory station; causing said test signals to be returned to said supervisory station from any repeater station which is in operative condition and connected with said supervisory station by a four-wire line section in operative condition, via said cross-connection in the respective repeater station and via the other pair of wires of said four-wire transmission line; and causing said test signals to be indicated at said supervisory station if and as they are returned from any of said repeater stations so that the indication of a returned test signal shows to what degree the repeater station from which it is returned and the four-wire transmission line section between the supervisory station and the particular repeater station are in operative condition.

3. A method of checking by means of test signals the operativeness of, and of locating existing faults in, a carrier-frequency communication system operating with at least one supervisory station and a plurality of repeater stations along a four-wire two-way transmission line, each of said repeater stations including cross-connection means interchangeable against each other and permitting only test signals but no intelligence signals to pass between the two pairs of wires of the four-wire transmission line, comprising the steps of: transmitting from a supervisory station via one of said pairs of wires a periodic sequence of test signals consisting of a pulse-amplitude modulated frequency located outside the frequency band used in ordinary communication through said carrier-frequency communication system; causing said test signals to be returned to said supervisory station from any repeater station which is in operative condition and connected with said supervisory station by a four-wire line section in operative condition, via said cross-connection in the respective repeater station and via the other pair of wires of said four-wire transmission line; and causing said test signals to be indicated oscillographically at said supervisory station if and as they are returned from any of said repeater stations, the sweep frequency of the oscillographical indication being equal to the repetition rate of said periodic sequence of test signals so that the indication of a returned test signal shows to what degree the repeater station from which it is returned and the four-wire transmission line section between the supervisory station and the particular repeater station are in operative condition.

4. A method of checking by means of test signals the operativeness of, and of locating existing faults in, a carrier-frequency communication system operating with at least one supervisory station and a plurality of repeater stations along a four-wire two-way transmission line, each of said repeater stations including cross-connection means interchangeable against each other and permitting only test signals but no intelligence signals to pass between the two pairs of wires of the four-wire transmission line, comprising the steps of: transmitting from a supervisory station via one of said pairs of wires a periodic sequence of test signals consisting of a pulse-amplitude modulated frequency located outside the frequency band used in ordinary communication through said carrier-frequency communication system, said test signals being characterized by a pulse shape having at least one flank deviating distinctly from the vertical, the repetition rate of said test signals being at most equal to the reciprocal of the transit time required for a test signal to travel from said supervisory station to the remotest one of said repeater stations to be checked by said supervisory station and to return from there to said supervisory station; causing said test signals to be returned to said supervisory station from any repeater station which is in operative condition and connected with said supervisory station by a four-wire line section in operative condition, via said cross-connection in the respective repeater station and via the other pair of wires of said four-wire transmission line; and causing said test signals to be indicated oscillographically at said supervisory station if and as they are returned from any of said repeater stations, the sweep frequency of the oscillographical indication being equal to the repetition rate of said periodic sequence of test signal so that the indication of a returned test signal shows to what degree the repeater station from which it is returned and the four-wire transmission line section between the supervisory station and the particular repeater station are in operative condition.

5. An arrangement for checking the operativeness of, and for locating existing faults in, a carrier-frequency communication system including a four-wire two-way transmission line adapted to carry intelligence signals in one pair of wires in one direction and in the other pair of wires in the opposite direction, comprising, in combination, at least one supervisory station connected with said four-wire transmission line and comprising generator means for producing a periodic sequence of test signals consisting of a pulse-amplitude modulated frequency located outside the frequency band used for intelligence transmission in said carrier-frequency communication system, and for applying said test signals to one pair of wires of said four-wire transmission line, and indicator means for indicating test signals returned to said supervisory station through the other pair of wires of said four-wire transmission line; and a plurality of repeater stations arranged along said four-wire transmission line and each including first amplifier means inserted in one pair of wires of said four-wire transmission line and second amplifier means inserted in the other pair of wires thereof, and filter means interchangeable against each other and transversely connected between the output of one of said amplifier means and the input of the other amplifier means and permitting passage only of said test signals from said one pair of wires to said other pair of wires, so that a test signal transmitted from said supervisory station will be returned thereto and indicated therein depending upon the operative condition of said repeater stations and the transmission line sections between said supervisory station and said repeater stations.

6. An arrangement for checking the operativeness of, and for locating existing faults in, a carrier-frequency communication system including a four-wire two-way transmission line adapted to carry intelligence signals in one pair of wires in one direction and in the other pair of wires in the opposite direction, comprising, in combination, at least one supervisory station connected with said four-wire transmission line and comprising generator means for producing a periodic sequence of test signals consisting of a pulse-amplitude modulated frequency located outside the frequency band used for intelligence transmission in said carrier-frequency communication system, and for applying said test signals to one pair of wires of said four-wire transmission line, and indicator means for indicating test signals returned to said supervisory station through the other pair of wires of said four-wire transmission line, said test signals being characterized by a pulse shape having at least one flank deviating distinctly from the vertical, the repetition rate of said test signals being at most equal to the reciprocal of the transit time required for a test signal to travel from said supervisory station to the remotest one of said repeater stations to be checked by said supervisory station and to return from there to said supervisory station; a plurality of repeater stations arranged along said four-wire transmission line and each including first amplifier means inserted in one pair of wires of said four-wire transmission line and second amplifier means inserted in the other pair of wires thereof, and filter means interchangeable against each other and transversely connected between the output of one of said amplifier means and the input of the other amplifier means and permitting passage only of said test signals from said one pair of wires to said other pair of wires, so that a test signal transmitted from said supervisory station will be returned thereto and indicated therein depending upon the operative condition of said repeater stations and the transmission line sections between said supervisory station and said repeater stations.

7. An arrangement for checking the operativeness of, and for locating existing faults in, a carrier-frequency communication system including a four-wire two-way transmission line adapted to carry intelligence signals in one pair of wires in one direction and in the other pair of wires in the opposite direction, comprising, in combination, at least one supervisory station connected with said four-wire transmission line and comprising generator means for producing a periodic sequence of test signals consisting of a pulse-amplitude modulated frequency located outside the frequency band used for intelligence transmission in said carrier-frequency communication system, and for applying said test signals to one pair of wires of said four-wire transmission line, and oscillograph means for indicating test signals returned to said supervisory station through the other pair of wires of said four-wire transmission line, the sweep frequency of said oscillograph means being equal to the repetition rate of said periodic sequence of test signals; and a plurality of repeater stations arranged along said four-wire transmission line and each including first amplifier means inserted in one pair of wires of said four-wire transmission line and second amplifier means inserted in the other pair of wires thereof, and filter means interchangeable against each other and transversely connected between the output of one of said amplifier means and the input of the other amplifier means and permitting passage only of said test signals from said one pair of wires to said other pair of wires, so that a test signal transmitted from said supervisory station will be returned thereto and indicated therein depending upon the operative condition of said repeater stations and the transmission line sections between said supervisory station and said repeater stations.

8. An arrangement for checking the operativeness of, and for locating existing faults in, a carrier-frequency communication system including a four-wire two-way transmission line adapted to carry intelligence signals in one pair of wires in one direction and in the other pair of wires in the opposite direction, comprising, in combination, at least one supervisory station connected with said four-wire transmission line and comprising generator means for producing a periodic sequence of test signal consisting of a pulse-amplitude modulated frequency located outside the frequency band used for intelligence transmission in said carrier-frequency communication system, and for applying said test signals to one pair of wires of said four-wire transmission line, and oscillograph means for indicating test signals returned to said supervisory station through the other pair of wires of said four-wire transmission line, the sweep frequency of said oscillograph means being equal to the repetition rate of said periodic sequence of test signals, electric coupling means providing for electrical coupling between said sweep frequency and said repetition rate; and a plurality of repeater stations arranged along said four-wire transmission line and each including first amplifier means inserted in one pair of wires of said four-wire transmission line and second amplifier means inserted in the other pair of wires thereof, and filter means interchangeable against each other and transversely connected between the output of one of said amplifier means and permitting passage only of said test signals from said one pair of wires to said other pair of wires so that a test signal transmitted from said supervisory station will be returned thereto and indicated therein depending upon the operative condition of said repeater stations and the transmission line sections between said supervisory station and said repeater station.

9. An arrangement for checking the operativeness of, and for locating existing faults in, a carrier-frequency communication system including a four-wire two-way transmission line adapted to carry intelligence signals in one pair of wires in one direction and in the other pair of wires in the opposite direction, comprising, in combination, at least one supervisory station connected with said four-wire transmission line and comprising generator means for producing a periodic sequence of test signals consisting of a pulse-amplitude modulated frequency located outside the frequency band used for intelligence transmission in said carrier frequency communication system, and for applying said test signals to one pair of wires of said four-wire transmission line, and oscillograph means for indicating test signals returned to said supervisory station through the other pair of wires of said four-wire transmission line, the sweep frequency of said oscillograph means being equal to the repetition rate of said periodic sequence of test signals, electric coupling means providing for electrical coupling between said sweep frequency and said repetition rate, said test signals being characterized by a pulse shape having at least one flank deviating distinctly from the vertical, the repetition rate of said test signals being at most equal to the reciprocal of the transit time required for a test signal to travel from said supervisory station to the remotest one of said repeater stations to be checked by said supervisory station and to return from there to said supervisory station; and a plurality of repeater stations arranged along said four-wire transmission line and each including first amplifier means inserted in one pair of wires of said four-wire transmission line and second amplifier means inserted in the other pair of wires thereof, and filter means interchangeable against each other and transversely connected between the output of one of said amplifier means and the input of the other amplifier means and permitting passage only of said test signals from said one paid of wires to said other pair of wires, so that a test signal transmitted from said supervisory station will be returned thereto and indicated therein depending upon the operative condition of said repeater stations and the transmission line sections between said supervisory station and said repeater stations.

10. An arrangement for checking the operativeness of, and for locating existing faults in, a carrier-frequency communication system including a four-wire two-way transmission line adapted to carry intelligence signals in one pair of wires in one direction and in the other pair of wires in the opposite direction, comprising, in combination, at least one supervisory station connected with said four-wire transmission line and comprising generator means for producing a periodic sequence of test signals consisting of a pulse-amplitude modulated frequency located outside the frequency band used for intelligence transmission in said carrier-frequency communication system, and for applying said test signals to one pair of wires of said four-wire transmission line, and indicator means for indicating test signals returned to said supervisory station through the other pair of wires of said four-wire transmission line; a plurality of repeater stations arranged along said four-wire transmission line and each including first amplifier means inserted in one pair of wires of said four-wire transmission line and second amplifier means inserted in the other pair of wires thereof, and filter means interchangeable against each other and transversely connected between the output of one of said amplifier means and the input of the other amplifier means and permitting passage only of said test signals from said one pair of wires to said other pair of wires; and blocking filter means arranged at selected spaced points, respectively, of said transmission line and passing intelligence signals transmitted at said carrier frequency but blocking the passage of said test signals so as to limit the transmission line portion to be tested by said test signals to the portion located between said spaced selected points, so that a test signal transmitted from said supervisory station will be returned thereto and indicated therein depending upon the operative condition of said repeater stations and the transmission line sections between said supervisory station and said repeater stations.

References Cited by the Examiner

UNITED STATES PATENTS

| | | | |
|---|---|---|---|
| 2,018,859 | 10/1934 | Leibe | 179—175.31 |
| 2,208,417 | 7/1940 | Gilbert | 179—175.31 |
| 2,580,097 | 12/1951 | Ilgenfritz et al. | 179—175.31 |
| 2,611,041 | 9/1952 | Cooper | 179—175.31 |
| 2,651,753 | 9/1953 | Buyer | 179—175.31 |

KATHLEEN H. CLAFFY, *Primary Examiner.*

J. W. JOHNSON, R. MURRAY, *Assistant Examiners*